DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 6, 1974

925 O.G. 9

T925,004

FLEXIBLE POLYURETHANE FOAM

John E. Besser, 4422 Harbor Drive; and Arthur P. Werts III, 1362 Lafayette Circle, both of Kingsport, Tenn. 37664; and James C. Martin, 601 N. Mountain View Circle, Johnson City, Tenn. 37601

Continuation of abandoned application Ser. No. 275,124, July 26, 1972. This application Aug 21, 1973, Ser. No. 390,291

Int. Cl. C08g *22/46*

U.S. Cl. 260—2.5 AC

No Drawing. 13 Pages Specification

The present invention provides a composition which is especially applicable to the one-shot process of making polyurethane foam. It has been discovered that this composition is particularly effective in catalyzing the reaction between the polyol and the diisocyanate and in crosslinking the polymer in a unique manner to provide an unexpected increase in physical properties such as tensile strength, tear resistance and compression set, as well as provide a desirable rise time. According to the present invention, the composition includes an N,N′-dialkyltoluenediamine and a tertiary amine. Conventional catalysts for polyurethane include various tertiary amines, but tertiary amines do not crosslink the polymer. Certain toluenediamines have also been used in the past as combination crosslinkers and catalysts, but the reaction rates are slower than when using typical commercial catalysts which do not crosslink the foam. It is believed that these toluenediamines are consumed in crosslinking the polymer before the complete use of it as a catalyst has been completed, thereby slowing the reaction time.